United States Patent [19]

Kleinbohl

[11] 3,935,996

[45] Feb. 3, 1976

[54] COUNTER MECHANISM FOR CONTINUOUS MEASUREMENTS, PARTICULARLY DISTANCE MEASUREMENTS

[75] Inventor: Helmut Kleinböhl, Goddelau, Germany

[73] Assignee: General Motors Corporation, Detroit, Mich.

[22] Filed: Feb. 20, 1975

[21] Appl. No.: 551,253

[30] Foreign Application Priority Data

Mar. 9, 1974 Germany ............................ 2411305

[52] U.S. Cl. .................. 235/95 R; 73/490; 116/114; 235/103

[51] Int. Cl.² .................. G01C 22/00; G01P 3/02; G01D 13/08; G06M 1/24

[58] Field of Search .............................. 73/488, 490; 235/95–97, 103, 132 R, 132 A, 144 PN; 116/114

[56] References Cited

UNITED STATES PATENTS

| | | | |
|---|---|---|---|
| 1,195,494 | 8/1916 | Nichols | 235/95 R |
| 3,054,558 | 9/1962 | Frenchtel | 235/95 R |
| 3,856,195 | 12/1974 | Kakizaki | 235/97 |

*Primary Examiner*—Edith Simmons Jackmon
*Attorney, Agent, or Firm*—Kenneth H. MacLean, Jr.

[57] ABSTRACT

A counter mechanism for the digital measurement of increments of a selected physical quantity, such as distance travelled by a motor vehicle, includes a first set of numbered counting wheels rotatably mounted in sequence upon a driven shaft with gear means interconnecting said counting wheels one with another in a velocity ratio of 1 to 10, and a second set of numbered counting wheels similarly arranged on a second shaft driven from a predetermined one of said numbered counting wheels in said first set. The second set of counting wheels commences to count multiples of said increments when said predetermined one counting wheel commences to rotate. The second set of numbered counting wheels can be reset to zero by means of a ratchet resetting device without affecting the position of the first set of numbered counting wheels. Such a mechanism is useful as a mileage recorder in the speedometer of a motor vehicle, the second set of numbered counting wheels serving as a direct visual indication to an observer of the mechanism of an attainment of a predetermined number of miles covered by the vehicle, which predetermined number correlates to a mileage limit for servicing, for example, a catalytic exhaust gas system on the vehicle. Preferably electrical contact means on the second set of counting wheels actuates a visual or audible warning signal once said predetermined number of miles is reached. Once the vehicle has been reserviced, the second set of numbered counting wheels is returned to zero to start indicating the second corresponding mileage limit.

7 Claims, 6 Drawing Figures

Fig.1
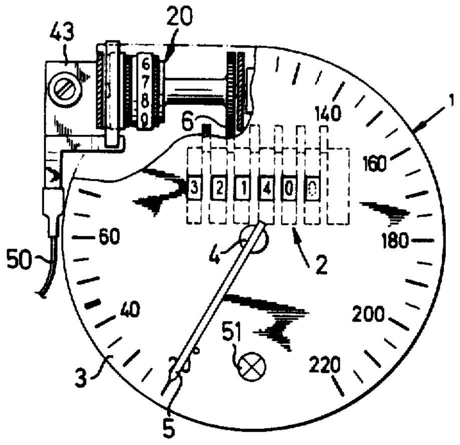
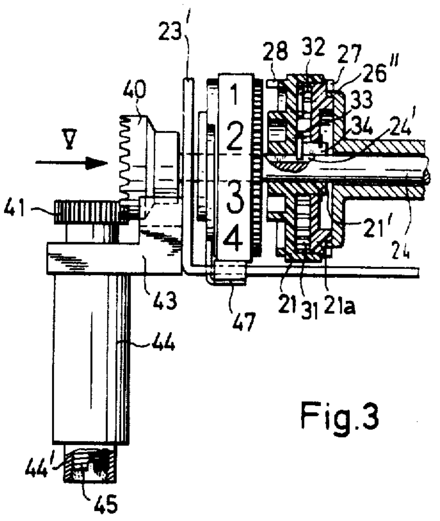
Fig.3
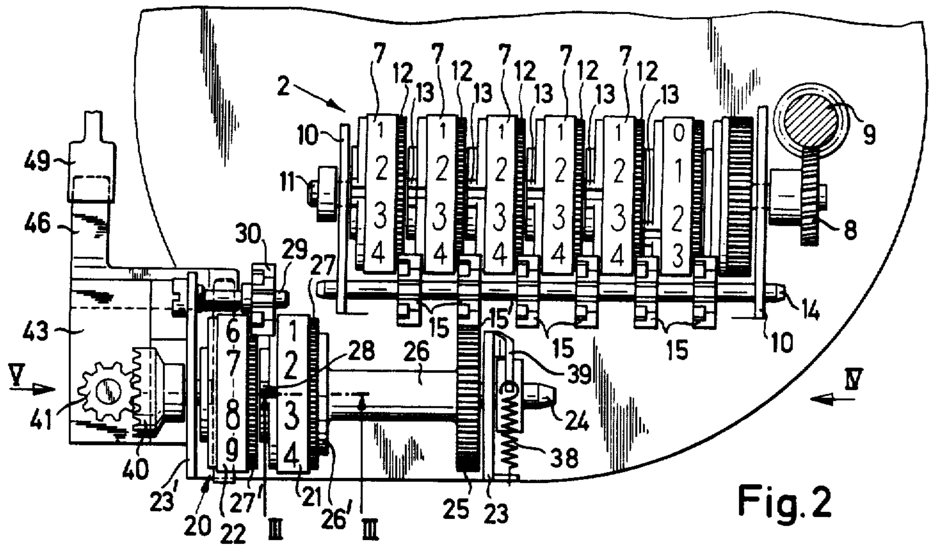
Fig.2

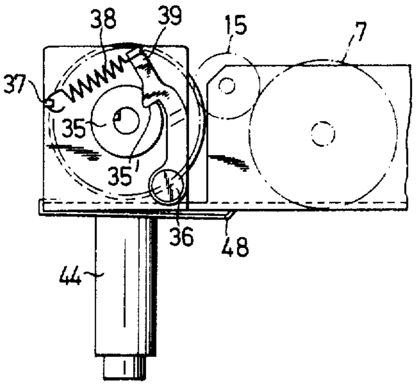
Fig. 4
Fig.5
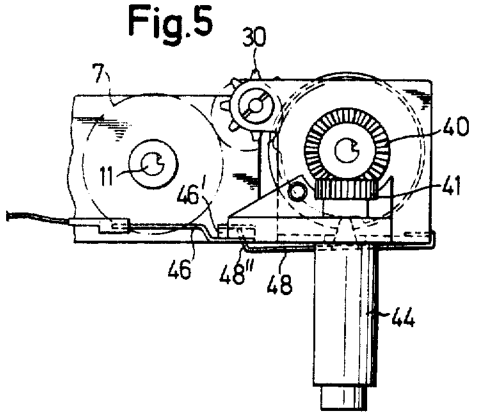
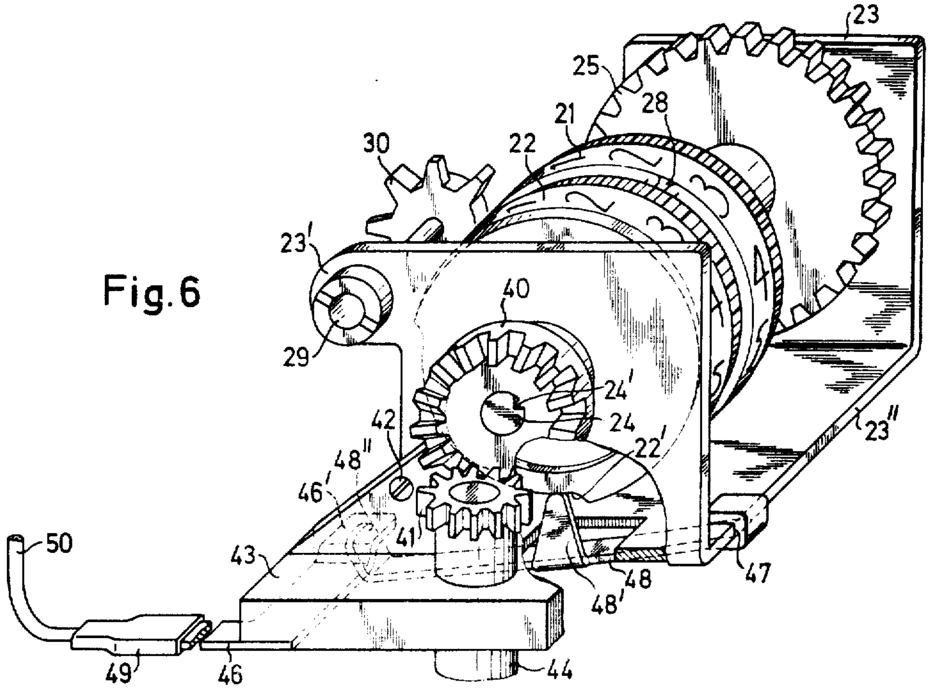
Fig. 6

COUNTER MECHANISM FOR CONTINUOUS MEASUREMENTS, PARTICULARLY DISTANCE MEASUREMENTS

The invention relates to a odometer-type counting mechanism for continuous measurements, particularly for measuring distances, and consisting of counting wheels of different unit values arranged on a drive shaft provided with a driving wheel, the wheels being rotatingly actuated, corresponding to their place value, through tangentially associated shift pinions, by way of the driving wheel.

The construction and function of an additive odometer-type counting mechanism are known. Such odometer-type counting mechanisms may be used for example as mileage recorders in motor vehicles and are often designed as multiple counting mechanisms, i.e. they have an integrated counting wheel assembly which measures the partial distance covered and serves as a so-called trip recorder.

The invention proceeds from the problem of making distance-dependent operating conditions more easily monitored, particularly in motor vehicles, and of indicating them to the driver of the vehicle.

According to the invention, this problem is solved with the aid of an odometer-type counting mechanism of the above-mentioned kind by arranging that, in a manner known per se, the odometer-type counting mechanism is in effective communication with a second resettable or returnable odometer-type counting mechanism, particularly for part-distance measurement, this second counting mechanism being positively connected by its driving wheel to a digit counting wheel of higher unit value of the first odometer-type mechanism, or to its shift pinion. Advantageously, in a manner known per se, the second odometer-type counting mechanism comprises digit counting wheels which are arranged on a second drive shaft rotatably mounted in end frames of the casing, parallel with the drive shaft of the first odometer-type mechanism, and which, also in a manner known per se, are rotatingly driven corresponding with their unit value, via the drive wheel, after the manner of a two-tooth gear, by tangentially associated pinions, whilst the drive wheel of the second odometer-type counting mechanism is positively coupled with the shift pinion of a digit counting wheel having units of the value "one thousand," and belonging to the first odometer-type counting mechanism.

The result is that an operating condition developing after a fairly high mileage, say 18,000 miles (30,000 kilometers), such as the limit of effectiveness of a catalytic exhaust gas system, can easily be indicated, and appropriate steps for servicing can be taken.

In a further advantageous embodiment of the invention, the second odometer-type counting mechanism can be made resettable or reversible in a manner known per se and is provided with a leadsealed actuating element for the resetting, so that, after completion of the maintenance by the indicated operating condition, the counting mechanism can be set back. For this purpose, advantageously a free end of the drive shaft of the second odometer-type counting mechanism is in effective communication with the actuating element, and is provided with an arresting device permitting a rotary movement in one direction of rotation only (i.e., the direction of rotation for resetting). Appropriately, this takes the form of a one-way ratchet device arranged at the other free end of the drive shaft.

A further advantageous formation resides in the fact that a contact tongue engages with the periphery of a digit counting wheel-particularly a higher one - belonging to the second odometer-type counting mechanism, the tongue carrying a contact which co-operates with another contact for completing an electrical circuit to release a visual or audible signal indication, upon attainment of a certain unit value on this digit counting wheel. Here it may be appropriate to arrange that the contact tongue is secured by its free end facing the contact, to the casing wall of the second odometer-type counting mechanism and is provided with a sensing member which engages with the digit counting wheel and which, within the unit value range of the digit counting wheel, rests in a cavity arranged on the periphery of the digit counting wheel, for the purpose of releasing and maintaining the signal indication.

As a preferred field of application of the invention, vehicles, particularly passenger vehicles, come into consideration. Here the odometer-type counting mechanism according to the invention can be employed advantageously as a mileage recorder in a speedometer instrument (tachometer). The digit counting wheel of higher place value of the second odometer-type counting mechanism closes the electric contact in the range of a unit value, say eighteen thousand miles (30,000 kilometers) corresponding to a limiting value or 'life' of a vehicle component. Alternatively, in this range it is provided with a colour marking which can be seen in the field of vision of the speedometer. Such an application of the invention achieves the advantage that an odometer-type counting mechanism present in any case (usually integrated with a speedometer) may be employed to monitor and indicate distance-dependent operating conditions. Alternatively such an odometer-type counting mechanism can be additionally incorporated in the speedometer instrument without the creation of additional monitoring elements for such operating conditions being required.

These and other features of the invention will be explained in greater detail below with reference to the accompanying drawings, in which:

FIG. 1 is a front elevation of a speedometer instrument fitted with an odometer-type counting mechanism, but provided with a further adometer-type counting mechanism, FIG. 2 is a plan view of the two odometer-type counting mechanisms, according to FIG. 1, on an enlarged scale, FIG. 3 is a partial presentation of the further odometer-type counting mechanism according to FIG. 2, shown partially in section on line III—III in FIG. 2, on an enlarged scale, FIG. 4 is a side elevation of the odometer-type counting mechanism seen in the arrowed direction IV in FIG. 2, FIG. 5 is a side elevation of the odometer-type counting mechanism seen in the arrowed direction V in FIG. 2, and FIG. 6 is a perspective presentation of the further odometer-type counting mechanism to an enlarged scale.

A speedometer designated in FIG. 1 with the general reference numeral 1, consists of an odometer-type counting mechanism 2 constructed as a distance recorder, and of a speedometer of usual design, but not shown in greater detail. Of this speedometer, the dial 3 with the pointer 5 mounted at 4 will be apparent. A further odometer-type counting mechanism 20 is in an effective geared connection with the odometer-type counting mechanism 2, at 6.

The first odometer-type counting mechanism 2 (FIG. 2) includes a number of digit counting wheels 7, each provided with a set of figures from 1 to 9 at the periphery thereof. These counting wheels are rotatably arranged on a shaft 11 mounted in end frames 10 and actuated from a speedometer worm gear 9 through a driving wheel 8. After the manner of a two-tooth transmission, the counting-wheels are provided with axially directed teeth 12, 13 which are located at opposite peripheral faces and have in this instance, twenty teeth 12 and two teeth 13 respectively. Toothed pinions 15 are mounted freely rotatable on a common shaft 14 and are engageable with these teeth. These pinions, every second tooth of which is shortened in the axial direction, actuate the digit counting wheels 7 through the driving wheel 8. In a manner known per se, the arrangement of the counting mechanism is conceived in such a way that, commencing from the drive wheel 8, the numerical value indicated by each digit counting wheel increases tenfold that of the preceding digit counting wheel, i.e. each unit on the first digit counting wheel 7 directly adjacent the drive wheel 8 has the value 0.1 (kilometers), and each unit on the last digit counting wheel 7 has the value 10.000 (kilometers).

The further odometer-type counting mechanism 20 is of a construction similar to the first counting mechanism 2, and consists of two reversible resettable digit counting wheels 21, 22 which are so arranged on a shaft 24 rotatably mounted in end frames 23, 23′ of the speedometer housing that they are freely rotatable in one direction of rotation but are arrested in the other direction of rotation. The gearing arrangement of the further odometer-type counting mechanism 20 with respect to the first counting mechanism 2 is so conceived that the drive for the further odometer-type counting mechanism is effective from that pinion 15 of the first counting mechanism which is assigned to the counting wheel 7 having units of the numerical value 1000 and which, at 15′ (6 in FIG. 1) is in engagement with a driving pinion 25 of the counting mechanism 20. This pinion 25 is secured to a hollow shaft 26 rotatably mounted on shaft 24. The hollow shaft 26 provided with a flange-shaped end 26′ by means of several lugs 26″ extending axially at its periphery (FIGS. 2,3) engages positively 2, 3) axially extending peripheral teeth 27 of the digit counting wheel 21 and drives the latter, via a directional ratchet gear, in synchronism with the rotary motion of the aforesaid digit counting wheel 7 of the first odometer-type counting mechanism 2 which has units of the numerical value 1000. The drive from the digit counting wheel 21 to the digit counting wheel 22 also takes place in the same manner as with the first odometer-type counting mechanism. With the aid of two teeth 28 extending axially from the periphery of digit counting wheel 21, the drive is transmitted, via a pinion 30 rotatably mounted on a shaft 29 secured to the end frame 23′, to axially extending peripheral teeth 27′ on the digit counting wheel 22. Since each digit counting wheel is required to be resettable, said counting wheel consists of two parts which are rotatably movable with respect to each other. The construction of these counting wheels will be described below with reference to digit counting wheel 21 shown in section in FIG. 3.

The digit counting wheel 21, provided with numbers on its periphery, has an annular cavity between its outer circumference and its hub 21′ which hub is arranged rotationally movable on shaft 24. Engaging in this cavity, there is a toothed disc 21*a* which has the axially-extending teeth 27 at its outer periphery and is rotatably mounted on the hub 21′. This toothed disc is provided with an inner set of teeth 31 which, as a directional ratchet gear, cooperates with a pawl 32, mounted resiliently and pivotably movable on the digit counting wheel 21. At the same time a further pawl 33, arranged inside the digit counting wheel 21 to be pivotally movable and diametrically opposite to pawl 32, passes through a cavity 34 in the hub 21′ and resiliently engages in a longitudinal groove 24′ of shaft 24. It cooperates with this groove in the manner of a further directional ratchet gear which operates in a contrary sense to the internally toothed ratchet gear 31 and pawl 32, so that the digit counting wheel 21 is freely rotatable solely in the forward shift direction. A third directional ratchet gear assigned to the odometer-type counting mechanism 20 is situated at the free end of shaft 24 adjacent the end frame 23. As will be seen from FIGS. 2 and 4, it consists of a ratchet wheel 35 fixed on the shaft, and of an arresting detent or pawl 39 which is pivotally mounted on the end frame 23 at 36. Under the action of a tension spring 38 secured to the end frame 23 at 37, this pawl engages in a notch in the ratchet wheel at 35′ with a spring-loaded positive action.

Secured to the other end of shaft 24, there is a crown wheel 40 meshing with a toothed pinion 41 which is rotatably mounted in a plate 43 projecting from and screwed on to the bearing end frame 23′ at 42 (FIG. 6), and is connected to a pin 44 accessible from outside the speedometer. At 44′, the free extremity of the pin carries a normally lead-sealed screw 45 in order that the crown wheel transmission (40, 41) may be rotated by means of a screwdriver for setting back the counting mechanism 20.

The counting mechanism 20 is further fitted with an electrical make-and-break arrangement consisting of a contact strip 46 secured to plate 43, and of a contact tongue 48 resiliently attached at 47 to a wall 23″ connecting the bearing end frames 23, 23′. A lug 48′, bent over from the contact tongue approximately at right angles, lies against the periphery of the digit counting wheel 22, which periphery has a depression in a section 22′ extending over a certain region of the periphery. The free bent-over end 48″ of the contact tongue comes into electrical contact with the likewise bent-over resilient free end 46′ of the contact strip 46 when the lug 48′ enters the depressed section 22′ of the periphery of digit counting wheel 22. Via a cable 50, and a cable shoe 49, the establishment of this contact closes the circuit of an illuminable indicator 51 (FIG. 1).

The mode of operation of the arrangement is as follows:

At 15′, the odometer-type counting mechanism 20 is driven from pinion 15 of the first counting mechanism 2 assigned to the digit counting wheel 7 having units of numerical value 1000, so that digit counting wheel 21 turns in synchronism with this digit counting wheel 7 of the first odometer-type counting mechanism, whilst the positive transmission of power to the digit counting wheel 21 from the driving pinion 25, and from the toothed disc 21*a* firmly firmly connected with it via the lugs 26″, takes place by way of the ratchet gear 31, 32. With its set of teeth 28, and via pinion 30, this digit counting wheel 21 drives the succeeding digit counting wheel 22 in synchronism with the last digit counting wheel 7 having units of value 10,000 in the first odometer-type counting mechanism 2. Assume for example that the depression 22′ at the periphery of the digit counting wheel 22 commences in the region of the figure three on this digit counting wheel, i.e. corresponding to the unit value 30,000. This means that, upon attainment of a covered distance on the odometer-type counting mechanism, corresponding to the unit value 30,000, the contact tongue 48, first of all resting with its lug 48′ against the periphery of the digit counting wheel 22, will drop into the depression 22′, the contacts 46′ and 48″ will close, and the illuminable indicator 51 on the dial 3 will light up. Assume further that, at this moment, some operational condition has been reached, for example the possible limit of effectiveness of an exhaust gas catalyst in the vehicle. This has been signalled by the lighting up of the illuminable indicator 51, indicating that a renewal of the particular unit is required. When the renewal of the unit concerned with the operating condition has been completed, resetting of the odometer-type counting mechanism 20 is easily carried out with the aid of a screwdriver applied to the screw 45 (FIG. 3). It turns the crown wheel gear 40, 41 and therefore the shaft 24 in the forward shift direction. Here, by the positive locking of the directional ratchet gear 24′, 33 and and the free-wheel of the ratchet gear 31, 32 and of the ratchet gear 35, 39, the digit counting wheels 21, 22 are set back to a zero setting, without the odometer-type counting mechanism 2 being involved in this resetting.

I claim:

1. A counting mechanism for the digital measurement of increments of a selected physical quantity, such as distance travelled by a motor vehicle, said counting mechanism comprising:

a first and a second odometer-type counting assembly, each having a plurality of counting wheels arranged side-by-side on a common shaft, each counting wheel bearing the numbers 0 – 9 on its periphery, said wheels being interconnected one with another so that the advancement of a wheel of one value by an amount corresponding to 10 digits produces an advancement of the adjacent wheel of the next highest value by an amount corresponding to one digit;

an input drive means to the mechanism, coupled to the common shaft of said first counting assembly;

a subsidiary drive means mechanically coupled between a predetermined one of said counting wheels in said first counting assembly and the common shaft of the second counting assembly so that the common shaft of the second counting assembly rotates in synchronism with said predetermined counting wheel;

and resetting means on said second counter assembly for resetting the counting wheels therein back to an indicated number value of zero;

whereby the number value indicated by the counting wheels of the second counting assembly is a direct visual indication to an observer of the mechanism of an attainment of a predetermined number of said increments of the selected physical quantity during a first period of time, and thereafter said counting assembly can be reset to zero to indicate said attainment during a second and subsequent periods of time.

2. A counter mechanism according to claim 1, in which the subsidiary drive means is mechanically coupled to the counting wheel in the first counting assembly which bears on the periphery thereof numbers which represent units of the numerical value of a thousand of said increments.

3. A counter mechanism for the digital measurement of increments of a selected physical quantity, such as distance travelled by a motor vehicle, said counting mechanism comprising:

a first and a second odometer-type counting assembly, each having a plurality of counting wheels arranged side-by-side on a common shaft, each counting wheel bearing the numbers 0 – 9 on its periphery, said wheels being interconnected one with another so that the advancement of a wheel of one value by an amount corresponding to 10 digits produces an advancement of the adjacent wheel of the next highest value by an amount corresponding to one digit;

an input drive means to the mechanism, coupled to the common shaft of said first counting assembly;

a subsidiary drive means mechanically coupled between a predetermined one of said counting wheels in said first counting assembly and the common shaft of the second counting assembly so that the common shaft of the second counting assembly rotates in synchronism with said predetermined counting wheel;

and resetting means on said second counter assembly for resetting the counting wheels therein back to an indicated number value of zero; said resetting means including an actuating means sealed with a removable seal to prevent the involuntary actuation thereof;

whereby the number value indicated by the counting wheels of the second assembly is a direct visual indication to an observer of the mechanism of an attainment of a predetermined number of said increments of the selected physical quantity during a first period of time, and thereafter said second counting assembly can be reset to zero to indicate said attainment during a second and subsequent periods of time.

4. A counter mechanism for the digital measurement of increments of a selected physical quantity, such as distance travelled by a motor vehicle, said counting mechanism comprising:

a first and a second odometer-type counting assembly, each having a plurality of counting wheels arranged side-by-side on a common shaft, each counting wheel bearing the numbers 0 – 9 on its periphery, said wheels being interconnected one with another so that the advancement of a wheel of one value by an amount corresponding to 10 digits produces an advancement of the adjacent wheel of the next highest value by an amount corresponding to one digit;

an input drive means to the mechanism, coupled to the common shaft of said first counting assembly;

a subsidiary drive means mechanically coupled between a counting wheel in the first counting assembly which bears on the periphery thereof numbers which represent units of the numerical value of a thousand of said increments and the common shaft of the second counting assembly so that the common shaft of the second counting assembly rotates in synchronism with said predetermined counting wheel;

and resetting means on said second counter assembly for resetting the counting wheels therein back to an indicated number value of zero, said resetting means including first ratchet means on the common shaft of the second counting assembly and second ratchet means within each of the counting wheels in the second counting assembly;

whereby the number value indicated by the counting wheels of the second counting assembly is a direct visual indication to an observer of the mechanism of an attainment of a predetermined number of said increments of the selected physical quantity during a first period of time, and thereafter said second counting assembly can be reset to zero to indicate said attainment during a second and subsequent periods of time.

5. A counter mechanism for the digital measurement of increments of a selected physical quantity, such as distance travelled by a motor vehicle, said counting mechanism comprising:

a first and second odometer-type counting assembly, each having a plurality of counting wheels arranged side-by-side on a common shaft, each counting wheel bearing the numbers 0 – 9 on its periphery, said wheels being interconnected one with another so that the advancement of a wheel of one value by an amount corresponding to 10 digits produces an advancement of the adjacent wheel of the next highest value by an amount corresponding to one digit;

an input drive means to the mechanism, coupled to the common shaft of said first counting assembly;

a subsidiary drive means mechanically coupled between a counting wheel in the first counting assembly which bears on the periphery thereof numbers which represent units of the numerical value of a thousand of said increments and the common shaft of the second assembly so that the common shaft of the second counting assembly rotates in synchronism with said predetermined counting wheel;

resetting means on said second counter assembly for resetting the counting wheels therein back to an indicated number value of zero; said resetting means including first ratchet means on the common shaft of the second counting assembly and second ratchet means within each of the counting wheels in the second counting assembly;

and electrical contact means on the periphery of a predetermined counting wheel in the second counting assembly for releasing a visual or audible signal when the number indicated by the counting wheels of the second counting assembly reaches a predetermined value;

whereby an observer of the mechanism is warned of the attainment of a predetermined number of said increments of the selected physical quantity during a first period of time, and thereafter said counting assembly can be reset to zero to indicate said attainment during a second and subsequent periods of time.

6. A counter mechanism according to claim 5, in which the periphery of said predetermined counting wheel is provided with a depression therein, and the electrical contact means includes a movable contact which registers with, and is retained within, said depression to release said signal indication when said predetermined number value is reached, the peripheral length of said depression being such that the signal indication is maintained until the numerical value displayed by said predetermined counting wheel has increased by a predetermined amount.

7. A speedometer for use in a motor vehicle equipped with a catalytic exhaust system requiring servicing after the motor vehicle has covered a predetermined distance, said speedometer including a counter mechanism for the digital measurement of increments of distance travelled by said motor vehicle, said counter mechanism comprising:

a first and a second odometer-type counting assembly, each having a plurality of counting wheels arranged side-by-side on a common shaft, each counting wheel bearing the numbers 0 – 9 on its periphery, said wheels being interconnected one with another so that the advancement of a wheel of one value by an amount corresponding to 10 digits produces an advancement of the adjacent wheel of the next highest value by an amount corresponding to one digit;

an input drive means to the mechanism, coupled to the common shaft of said first counting assembly;

a subsidiary drive means mechanically coupled between a counting wheel in the first counting assembly which bears on the periphery thereof numbers which represent units of the numerical value of a thousand of said increments and the common shaft of the second counting assembly so that the common shaft of the second counting assembly rotates in synchronism with said predetermined counting wheel;

resetting means on said second counter assembly for resetting the counting wheels therein back to an indicated number value of zero; said resetting means including first ratchet means on the common shaft of the second counting assembly and second ratchet means within each of the counting wheels in the second counting assembly;

and electrical contact means on the periphery of a predetermined counting wheel in the second counting assembly for releasing a visual or audible signal when the number value indicated by the counting wheels of the second counting assembly reaches a predetermined value corresponding to said predetermined distance, the periphery of said predetermined counting wheel being provided with a depression therein, and the electrical contact means including a movable contact which registers with, and is retained within, said depression to release said signal indication when said predetermined number value is reached, the peripheral length of said depression being such that the signal indication is maintained until the numerical value displayed by said predetermined counting wheel has increased by a predetermined amount;

whereby a driver of the vehicle is warned of the attainment of said predetermined distance after a first period of time, and thereafter said second counting assembly can be reset to zero to indicate said attainment after a second and subsequent periods of time.

* * * * *